US 11,571,658 B2

(12) United States Patent
Younes et al.

(10) Patent No.: US 11,571,658 B2
(45) Date of Patent: Feb. 7, 2023

(54) CARBON DIOXIDE CAPTURE

(71) Applicant: Saudi Arabian Oil Company, Dhahran (SA)

(72) Inventors: Mourad Younes, Dhahran (SA); Aqil Jamal, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 210 days.

(21) Appl. No.: 17/140,274

(22) Filed: Jan. 4, 2021

(65) Prior Publication Data

US 2022/0212141 A1 Jul. 7, 2022

(51) Int. Cl.
*B01D 53/62* (2006.01)
*B01D 53/08* (2006.01)

(52) U.S. Cl.
CPC .......... *B01D 53/62* (2013.01); *B01D 53/08* (2013.01); *B01D 2215/022* (2013.01); *B01D 2221/16* (2013.01); *B01D 2257/504* (2013.01)

(58) Field of Classification Search
CPC .......... B01D 53/62; B01D 553/08; B01D 2215/022; B01D 2221/16; B01D 2257/504
USPC .......................................................... 423/220
See application file for complete search history.

(56) References Cited

U.S. PATENT DOCUMENTS

| 3,498,026 A | 3/1970 | Messinger et al. |
| 3,818,679 A | 6/1974 | Klass et al. |
| 8,043,588 B2 | 10/2011 | Hustad et al. |
| 8,500,859 B2 | 8/2013 | Eisenbeger |
| 10,173,145 B2 | 1/2019 | Nishibe et al. |
| 2013/0202517 A1 | 8/2013 | Ayala et al. |
| 2015/0231561 A1 | 8/2015 | Reardon et al. |

FOREIGN PATENT DOCUMENTS

| DE | 3731892 | 4/1989 |
| JP | S5564824 | 5/1980 |
| JP | H08323137 | 12/1996 |
| WO | WO 2010107942 | 9/2010 |

(Continued)

OTHER PUBLICATIONS

PCT International Search Report and Written Opinion in International Appln. No PCT/US2022/011164, dated Jun. 30, 2022, 19 pages.

(Continued)

*Primary Examiner* — Anita Nassiri-Motlagh
(74) *Attorney, Agent, or Firm* — Fish & Richardson P.C.

(57) ABSTRACT

An apparatus includes a housing that defines a first zone, a second zone, a third zone, and a fourth zone. The apparatus includes an inlet, a first outlet, a second outlet, and a conveyor belt. The inlet is configured to receive a carbon dioxide-containing fluid in the first zone. The first outlet is configured to discharge a carbon dioxide-depleted fluid from the first zone. The second outlet is configured to discharge a carbon dioxide-rich fluid from the third zone. The conveyor belt passes through each of the zones. The conveyor belt includes a carbon dioxide sorbent. Within the first zone, the carbon dioxide sorbent is configured to adsorb carbon dioxide from the carbon dioxide-containing fluid to produce the carbon dioxide-depleted fluid. Within the third zone, the carbon dioxide sorbent is configured to desorb the captured carbon dioxide to produce the carbon dioxide-rich fluid.

20 Claims, 7 Drawing Sheets

(56) References Cited

FOREIGN PATENT DOCUMENTS

| WO | WO 2013028688 | 2/2013 |
|----|---------------|--------|
| WO | WO 2014170184 | 10/2014 |

OTHER PUBLICATIONS

PCT International Search Report and Written Opinion in International Appln. No. PCT/US2022/011169, dated May 3, 2022, 14 pages.

U.S. Appl. No. 17/140,258, Younes et al., filed Jan. 4, 2021.

IEA, "Putting CO2 to Use: Creating value from emissions," Sep. 2019, 86 pages.

Chu et al., "Negatively Thermoresponsive Membranes with Functional Gates Driven by Zipper-Type Hydrogen-Bonding Interactions," Angew. Chem, Int. Ed., 2005, 44:2124-2127.

Fasihi et al., "Techno-economic assessment of CO2 direct air capture plants," Journal of Cleaner Production, Jul. 2019, 224:957-980.

Goeppert et al., "Air as the renewable carbon source of the future: an overview of CO2 capture from the atmosphere," Energy & Environmental Science, 2012, 5:7833-7853.

Keith et al., "A Process for Capturing CO 2 from the Atmosphere," Joule, Aug. 2018, 23 pages.

Knipe et al., "CO2 Absorption and Regeneration Cycling with Micro-Encapsulated CO2 Sorbents," Environmental Science & Technology, Feb. 2018, 24 pages.

Park et al., "Reversible Self-Actuated Thermo-Responsive Pore Membrane," Scientific Report, Dec. 2016, 10 pages.

Pitchaimani et al., "Manufacturable plastic microfluidic valves using thermal actuation," Lab on a Chip, Aug. 2009, 9(21):3082-3087.

Vericella et al., "Encapsulated liquid sorbents for carbon dioxide capture," Nature Communications, Feb. 2015, 7 pages.

Wang et al., "CO2 capture by solid adsorbents and their application: current status and new trends," Energy & Environmental Science, 2011, 4:42-55.

Alami et al., "Materials and logistics for carbon dioxide capture, storage and utilization," Science of the Total Environment, Feb. 2020, 717:137221 13, pages.

D'Allesandro et al., "Carbon dioxide capture: prospects for new materials," Angewandte Chemie International Edition, Jul. 2010, 49(35):6058-6082, 25 pages.

Hu et al., "Development of novel mordenite-filled chitosan-poly(acrylic acid) polyelectrolyte complex membranes for pervaporation dehydration of ethylene glycol aqueos solution," Journal of Membrane Science, Mar. 2007, 293(1-2):142-150, 9 pages.

Wang et al., "Moisture swing sorbent for carbon dioxide capture from ambient air," Environmental Science & Technology, Jun. 2011, 45(15):6670-6675, 6 pages.

PCT Invitation to Pay Additional Fees and, where applicable, Protest Fee in International Appln. No PCT/US2022/011164, dated May 6, 2022, 16 pages.

CARBON DIOXIDE CAPTURE

TECHNICAL FIELD

This disclosure relates to carbon dioxide capture.

BACKGROUND

With rising concerns of climate change and greenhouse gas emissions, carbon dioxide capturing processes can be an avenue for mitigating emissions. Typically, carbon dioxide captured from large point sources, such as cement factories and biomass power plants, is transported and sequestered in an underground geological formation, so that it does not enter the atmosphere. In some cases, carbon dioxide can be captured from air. In some cases, the carbon dioxide captured in such processes can be used as part of a feedstock for creating synthetic fuels.

SUMMARY

This disclosure describes technologies relating to carbon dioxide capture. Certain aspects of the subject matter described can be implemented as an apparatus. The apparatus includes a housing, an inlet, a first outlet, a second outlet, and a conveyor belt. The housing defines a first zone for carbon dioxide adsorption, a second zone for sorbent heating, a third zone for carbon dioxide desorption, and a fourth zone for sorbent cooling. The second zone is filled with a liquid heating medium. The fourth zone is filled with a liquid cooling medium. The liquid heating medium in the second zone forms a first hydraulic seal between the first zone and the third zone. The liquid cooling medium in the fourth zone forms a second hydraulic seal between the first zone and the third zone. The inlet is configured to receive a carbon dioxide-containing fluid in the first zone. The first outlet is configured to discharge a carbon dioxide-depleted fluid from the first zone. The second outlet is configured to discharge a carbon dioxide-rich fluid from the third zone. The conveyor belt is disposed within the housing. The conveyor belt passes through each of the first zone, the second zone, the third zone, and the fourth zone. The conveyor belt includes a porous medium. The porous medium includes a carbon dioxide sorbent. The conveyor belt is configured to rotate within the housing, such that at least a portion of the carbon dioxide sorbent cycles through the first zone, the second zone, the third zone, and the fourth zone repeatedly in sequential order. Within the first zone at a first temperature, the carbon dioxide sorbent is configured to adsorb carbon dioxide from the carbon dioxide-containing fluid as the carbon dioxide-containing fluid flows through the porous medium to produce the carbon dioxide-depleted fluid. Within the third zone at a second temperature, the carbon dioxide sorbent is configured to desorb the carbon dioxide captured from the carbon dioxide-containing fluid to produce the carbon dioxide-rich fluid, thereby regenerating the carbon dioxide sorbent. The liquid heating medium in the second zone is configured to heat the carbon dioxide sorbent from the first temperature toward the second temperature. The liquid cooling medium in the fourth zone is configured to cool the carbon dioxide sorbent from the second temperature to the first temperature.

This, and other aspects, can include one or more of the following features.

In some implementations, the housing includes a wall that separates the second zone from the fourth zone. In some implementations, the wall is configured to transfer heat between the liquid heating medium in the second zone and the liquid cooling medium in the fourth zone.

In some implementations, the inlet is a first inlet, and the apparatus includes a second inlet configured to receive steam in the third zone.

In some implementations, the apparatus includes an electric heater disposed within the third zone. In some implementations, the liquid heating medium is configured to heat the carbon dioxide sorbent from the first temperature to a third temperature within the second zone, where the third temperature is intermediate of the first temperature and the second temperature. In some implementations, the electric heater is configured to heat the carbon dioxide sorbent from the third temperature to the second temperature within the third zone.

In some implementations, an operating pressure of the third zone is equal to or less than an operating pressure of the first zone.

In some implementations, the second zone includes baffles configured to stratify heat distribution in the liquid heating medium. In some implementations, the fourth zone includes baffles configured to stratify heat distribution in the liquid cooling medium.

In some implementations, the apparatus includes a heat exchanger disposed across the wall separating the second zone from the fourth zone. In some implementations, the heat exchanger is configured to facilitate heat transfer between the liquid heating medium in the second zone and the liquid cooling medium in the fourth zone.

In some implementations, the apparatus includes a circulation loop configured to circulate a portion of the liquid heating medium from the second zone through a region of the fourth zone to facilitate heat transfer between the liquid heating medium and the liquid cooling medium in the fourth zone.

In some implementations, the porous medium includes porous flexible layers, and the carbon dioxide sorbent is disposed between neighboring porous flexible layers of the porous medium.

In some implementations, the carbon dioxide sorbent is coated on fibers, and the fibers are disposed on the porous medium.

In some implementations, the conveyor belt includes blocks having a honeycomb structure. In some implementations, neighboring blocks are connected to each other to form the conveyor belt, and the carbon dioxide sorbent is disposed on a surface of each of the blocks, disposed within each of the blocks, or a combination of these.

In some implementations, at least one of the liquid heating medium or the liquid cooling medium includes a mixture of water and at least one of calcium chloride, potassium hydroxide, sodium hydroxide, lithium chloride, lithium bromide, ethylene glycol, propylene glycol, tri-ethylene glycol, zinc chloride, potassium formate, or sulfuric acid.

Certain aspects of the subject matter described can be implemented as a method. A porous medium is moved through a first zone of a housing by a conveyor belt disposed within the housing. The porous medium includes a carbon dioxide sorbent. A carbon dioxide-containing fluid is flowed to the porous medium within the first zone, thereby bringing the carbon dioxide-containing fluid in contact with the carbon dioxide sorbent. At least a portion of carbon dioxide from the carbon dioxide-containing fluid is adsorbed by the carbon dioxide sorbent as the carbon dioxide-containing fluid flows through the porous medium to produce a carbon dioxide-depleted fluid. The carbon dioxide-depleted fluid is discharged from the housing through a first outlet in the first zone. The porous medium is moved through a second zone of the housing by the conveyor belt. The porous medium is heated within the second zone using a liquid heating medium. The liquid heating medium forms a first hydraulic seal between the first zone and a third zone of the housing. The porous medium is moved through the third zone of the housing by the conveyor belt. The porous medium is heated within the third zone, thereby desorbing the carbon dioxide from the carbon dioxide sorbent to produce a carbon dioxide-rich fluid and regenerate the carbon dioxide sorbent. The carbon dioxide-rich fluid is discharged from the housing through a second outlet in the third zone. The porous medium is moved through a fourth zone of the housing by the conveyor belt. The porous medium is cooled within the fourth zone using a liquid cooling medium. The liquid cooling medium forms a second hydraulic seal between the first zone and the third zone.

This, and other aspects, can include one or more of the following features.

In some implementations, the housing includes a wall separating the second zone from the fourth zone. In some implementations, heat is transferred across the wall between the liquid heating medium in the second zone and the liquid cooling medium in the fourth zone.

In some implementations, heating the porous medium within the third zone includes flowing steam to the third zone, providing electrical power to an electric heater disposed within the third zone, or a combination of these.

In some implementations, an operating pressure of the third zone is equal to or less than an operating pressure of the first zone.

In some implementations, a portion of the liquid heating medium from the second zone is circulated through a region of the fourth zone to facilitate heat transfer between the liquid heating medium and the liquid cooling medium in the fourth zone.

In some implementations, the porous medium includes an electrically conductive material. In some implementations, heating the porous medium within the third zone includes applying a voltage across the electrically conductive material within the third zone.

In some implementations, at least one of the liquid heating medium or the liquid cooling medium includes a mixture of water and at least one of calcium chloride, potassium hydroxide, sodium hydroxide, lithium chloride, lithium bromide, ethylene glycol, propylene glycol, tri-ethylene glycol, zinc chloride, potassium formate, or sulfuric acid.

In some implementations, at least a portion of the liquid heating medium or the liquid cooling medium is sprayed into the first zone to come in contact with the carbon dioxide-containing fluid flowing to the porous medium within the first zone.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Figure 1A:
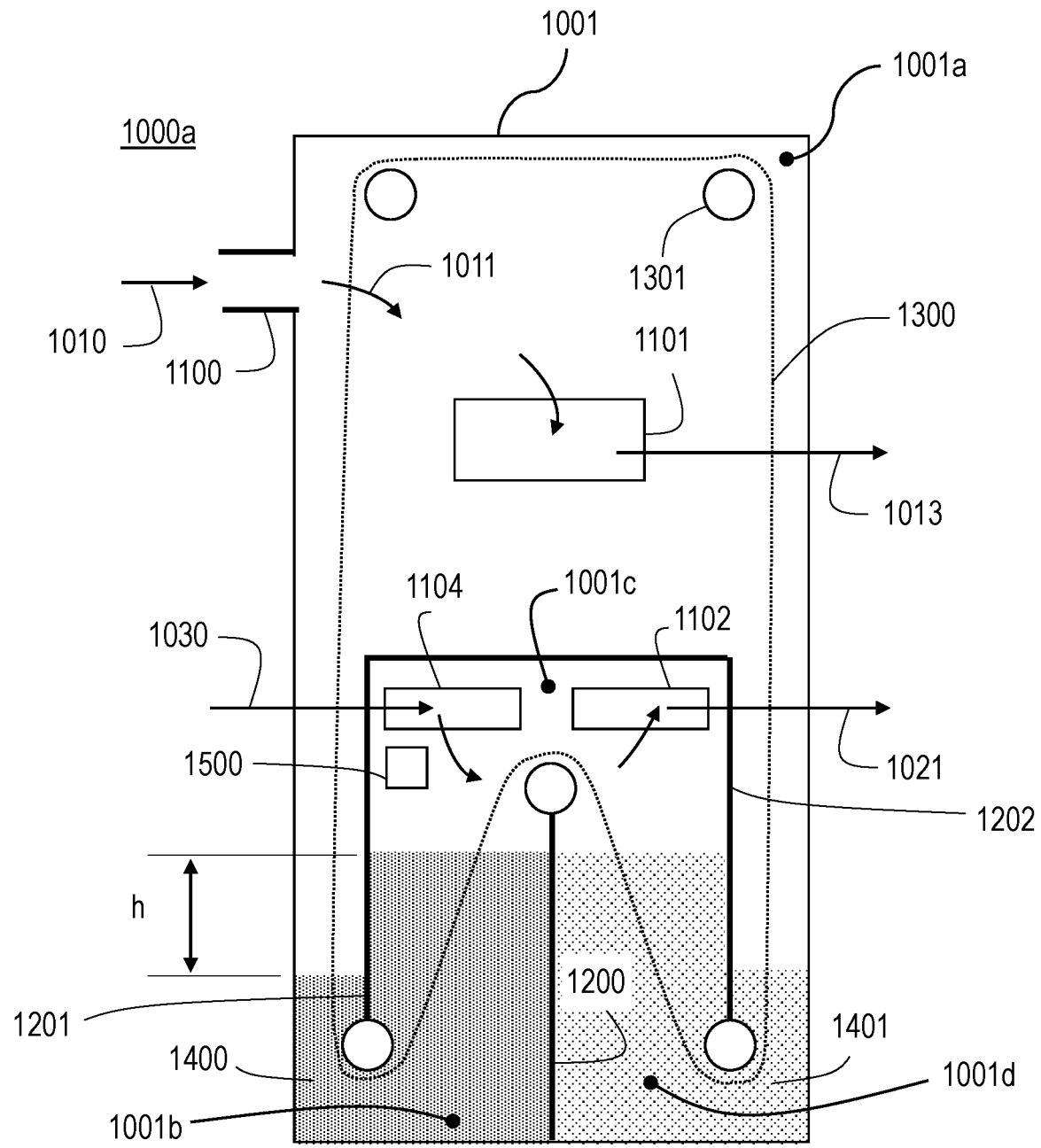
FIG. 1A is a schematic diagram of an example apparatus for carbon dioxide capture.

This disclosure describes carbon dioxide capturing apparatuses and methods. The apparatuses described include multiple zones through which a carbon dioxide sorbent is conveyed and cycled. The carbon dioxide sorbent adsorbs carbon dioxide from a carbon dioxide-containing fluid in a first zone to produce a carbon dioxide-depleted fluid. The carbon dioxide sorbent is heated in a second zone. Carbon dioxide is desorbed from the carbon dioxide sorbent in a third zone to produce a carbon dioxide-rich fluid and regenerate the carbon dioxide sorbent. The carbon dioxide sorbent is cooled in a fourth zone and cycles back to the first zone to repeat the process. All four zones are located within a single housing. The subject matter described in this disclosure can be implemented in particular implementations, so as to realize one or more of the following advantages. The apparatuses and methods described herein implement heat integration by transferring heat between the second and fourth zones, thereby improving efficiency. The apparatuses and methods described herein can be continuous while not requiring the use of a fluidized bed, which can be energy intensive. The apparatuses and methods described herein can require less energy (and in turn, incur less operating costs) in comparison to conventional apparatuses and methods for capturing carbon dioxide from carbon dioxide-containing fluids to produce carbon dioxide-rich fluids. The apparatuses and methods described herein can require fewer valves (and in turn, incur less capital costs) in comparison to conventional apparatuses and methods. The apparatuses and methods described herein can be implemented to produce carbon dioxide-rich fluids that are richer in purity in comparison to conventional apparatuses and methods. The apparatuses and methods described herein can be integrated with water removal, which can improve the carbon dioxide sorbent's working capacity.

In general, in adsorption based carbon dioxide capturing processes, the sorbent undergoes four phases: Phase I, which is the adsorption phase where carbon dioxide is captured from a carbon dioxide containing fluid; Phase II, which is the heating phase where the sorbent is heated to reach a desired desorption temperature; Phase III, which is the desorption phase where the sorbent is maintained at a temperature equal to or greater than the desorption temperature to desorb the captured carbon dioxide from the sorbent, which also results in regenerating the sorbent; and Phase IV, which is the cooling phase where the sorbent is cooled to return to its initial temperature to start another cycle starting back at Phase I.

Phases I and III are typically linked to the sorbent material itself, while Phases II and IV are typically linked to the sorbent material, the process configuration/conditions, and capability to recover the heat that is rejected during the cooling process in Phase IV and use the recovered heat in the heating process in Phase II. In some cases, the working capacity of the sorbent can be increased by decreasing the partial pressure of carbon dioxide. Decreasing the partial pressure of carbon dioxide can be carried out by introducing a sweep gas in Phase III, regenerating the sorbent during Phase III at a decreased pressure, or a combination of both. By increasing the working capacity of the sorbent, the amount of sorbent material used can be decreased while still being capable of capturing the same total amount of carbon dioxide, thereby reducing the energy consumption of the system, which can be beneficial especially for cases where carbon dioxide capture is desired from fluids containing low concentrations of carbon dioxide (for example, about 400 parts per million or less).

FIG. 1A is a schematic diagram of an apparatus $1000a$ for carbon dioxide capture. The apparatus $1000a$ includes a housing 1001, an inlet 1100, a first outlet 1101, a second outlet 1102, and a conveyor belt 1300. The housing 1001 defines a first zone $1001a$ for carbon dioxide adsorption, a second zone $1001b$ for sorbent heating, a third zone $1001c$ for carbon dioxide desorption, and a fourth zone $1001d$ for sorbent cooling. The second zone $1001b$ is filled with a liquid heating medium 1400, which forms a first hydraulic seal between the first zone $1001a$ and the third zone $1001c$. The fourth zone $1001d$ is filled with a liquid cooling medium 1401, which forms a second hydraulic seal between the first zone $1001a$ and the third zone $1001c$. The inlet 1100 is configured to receive a carbon dioxide-containing fluid 1010 in the first zone $1001a$. The first outlet 1101 is configured to discharge a carbon dioxide-depleted fluid 1013 from the first zone $1001a$. The second outlet 1102 is configured to discharge a carbon dioxide-rich fluid 1021 from the third zone $1001c$.

The conveyor belt 1300 is disposed within the housing 1001 and passes through each of the first zone $1001a$, the second zone $1001b$, the third zone $1001c$, and the fourth zone $1001d$. The conveyor belt 1300 includes a porous medium (320, shown in FIGS. 3A-3E and described in more detail later) that includes a carbon dioxide sorbent. The conveyor belt 1300 is configured to rotate within the housing 1001, such that at least a portion of the carbon dioxide sorbent cycles through the first zone $1001a$, the second zone $1001b$, the third zone $1001c$, and the fourth zone $1001d$ repeatedly in sequential order. In some implementations, the apparatus $1000a$ includes pulleys and/or cylinders 1301 to provide the mechanism by which the conveyor belt 1300 rotates through the various zones $1001a$, $1001b$, $1001c$, and $1001d$.

The carbon dioxide sorbent is configured to adsorb carbon dioxide from the carbon dioxide-containing fluid 1010 within the first zone $1001a$ as the carbon dioxide-containing fluid 1010 flows through the conveyor belt 1300 (depicted by flow arrow 1011) at a first temperature to produce the carbon dioxide-depleted fluid 1013. The carbon dioxide sorbent is configured to desorb the carbon dioxide captured from the carbon dioxide-containing fluid 1010 within the third zone $1001c$ at a second temperature to produce the carbon dioxide-rich fluid 1021. Desorbing the carbon dioxide from the carbon dioxide sorbent regenerates the carbon dioxide sorbent. In some implementations, the carbon dioxide sorbent includes a strong base (such as lithium hydroxide, potassium hydroxide, calcium hydroxide, or sodium hydroxide), a zeolite (such as silica type X zeolite or 13X zeolite), a metal organic framework (such as MOF SIFSIX-3-Cu), an amine based anionic exchange resin (such as quaternary amines attached to a polystyrene backbone), a supported organo-amine (such as pentaethylenehexamine (PEH), tetraethylenepentamine (TEP), monoethanolamine (MEA), diethanolamine (DEA), polyethylenimines, mesoporous silica functionalized with 3-[2-(2-aminoethylamino)ethylamino]propyltrimethoxysilane (TRI-PE-MCM-41)), or a combination of these.

The liquid heating medium 1400 in the second zone $1001b$ is configured to heat the carbon dioxide sorbent. In some implementations, the liquid heating medium 1400 heats the carbon dioxide sorbent from the first temperature toward the second temperature. The liquid cooling medium 1401 in the fourth zone $1001d$ is configured to cool the carbon dioxide sorbent. In some implementations, the liquid cooling medium 1401 cools the carbon dioxide sorbent from the second temperature to the first temperature. In some implementations, the first temperature is in a range of from −40 degrees Celsius (° C.) to 80° C. In some implementations, the first temperature is in a range of from 0° C. to 50° C. In some implementations, the second temperature is in a range of from 40° C. to 200° C. In some implementations, the second temperature is in a range of from 70° C. to 130° C.

In some implementations, the liquid heating medium 1400 and the liquid cooling medium 1401 are the same substance. In some implementations, the liquid heating medium 1400 and the liquid cooling medium 1401 are water based (that is, include water as a solvent). In some implementations, the liquid heating medium 1400 includes a hydrocarbon or a mixture of hydrocarbons. For example, the liquid heating medium 1400 includes nonane or another hydrocarbon with a normal boiling point in a range of from 100° C. to 200° C.

In some implementations, the liquid heating medium 1400 is a pure, single-component fluid. In some implementations, the liquid heating medium 1400 is a mixture of miscible fluids. In some implementations, the liquid heating medium 1400 includes dissolved solids, such as salts. In some implementations, the liquid heating medium 1400 is a mixture of non-miscible fluids. In some implementations, the liquid heating medium 1400 includes water, calcium chloride, potassium hydroxide, sodium hydroxide, lithium chloride, lithium bromide, ethylene glycol, propylene glycol, tri-ethylene glycol, zinc chloride, potassium formate, sulfuric acid, or a combination of these.

In some implementations, the liquid cooling medium 1401 is a pure, single-component fluid. In some implementations, the liquid cooling medium 1401 is a mixture of miscible fluids. In some implementations, the liquid cooling medium 1401 includes dissolved solids, such as salts. In some implementations, the liquid cooling medium 1401 is a mixture of non-miscible fluids. In some implementations, the liquid cooling medium 1401 includes water, calcium chloride, potassium hydroxide, sodium hydroxide, lithium chloride, lithium bromide, ethylene glycol, propylene glycol, tri-ethylene glycol, zinc chloride, potassium formate, sulfuric acid, or a combination of these.

The various zones $1001a$, $1001b$, $1001c$, and $1001d$ can be linked to the phases described previously. Phase I occurs in the first zone $1001a$. Phase II occurs in the second zone $1001b$ and the third zone $1001c$. Phase III occurs in the third zone 1001c. Phase IV occurs in the fourth zone 1001d. In some implementations, a residence time of a point on the conveyor belt 1300 traveling through the first zone 1001a is in a range of from 1 minute to 24 hours. In some implementations, the residence time of a point on the conveyor belt 1300 traveling through the first zone 1001a is in a range of from 15 minutes to 4 hours. In some implementations, a residence time of a point on the conveyor belt 1300 traveling through the second zone 1001b is in a range of from 10 seconds to 12 hours. In some implementations, the residence time of a point on the conveyor belt 1300 traveling through the second zone 1001b is in a range of from 5 minutes and 30 minutes. In some implementations, a residence time of a point on the conveyor belt 1300 traveling through the third zone 1001c is in a range of from 1 minutes to 12 hours. In some implementations, the residence time of a point on the conveyor belt 1300 traveling through the third zone 1001c is in a range of from 5 minutes and 4 hours. In some implementations, a residence time of a point on the conveyor belt 1300 traveling through the fourth zone 1001d is in a range of from 10 seconds to 12 hours. In some implementations, the residence time of a point on the conveyor belt 1300 traveling through the fourth zone 1001d is in a range of from 5 minutes and 30 minutes.

In some implementations, an operating pressure of the third zone 1001c is equal to or less than an operating pressure of the first zone 1001a. Operating the third zone 1001c at a decreased pressure allows for increased $CO_2$ desorption capacity and therefore increased $CO_2$ recovery from the carbon dioxide sorbent and the apparatus 1000a. Reducing the operating pressure reduces the $CO_2$ partial pressure and allows for more recovery of $CO_2$ from the sorbent for the same desorption temperature (second temperature). In turn, the amount of sorbent needed to recover the same amount of $CO_2$ can, in some cases, be reduced. In some cases, the desorption temperature (second temperature) can be reduced while keeping the amount of sorbent used constant to recover $CO_2$. Decreasing the desorption temperature can increase the overall efficiency of the apparatus 1000a, as decreased temperatures can be achieved more efficiently.

In some implementations, the housing 1001 includes a wall 1200 that separates the second zone 1001b from the fourth zone 1001d. In some implementations, the wall 1200 is configured to transfer heat between the liquid heating medium 1400 in the second zone 1001b and the liquid cooling medium 1401 in the fourth zone 1001d. The height h, which represents the difference in liquid head between the vapor/liquid interface between the first zone 1001a and the second zone 1001b and the vapor/liquid interface between the second zone 1001b and the third zone 1001c, fluctuates based on the pressure difference between the first zone 1001a and the third zone 1001c.

In some implementations, the housing 1001 includes a second wall 1201 running through a portion of the second zone 1001b. In such implementations, the second zone 1001b wraps around the second wall 1201 resembling a U-shape and is delimited by the vapor/liquid interfaces that define the boundaries between: the first zone 1001a and the second zone 1001b; and the second zone 1001b and the third zone 1001c. The difference in liquid head between the vapor/liquid interface between the first zone 1001a and the second zone 1001b and the vapor/liquid interface between the second zone 1001b and the third zone 1001c fluctuate based on the pressure difference between the first zone 1001a and the third zone 1001c.

In some implementations, the housing 1001 includes a third wall 1202 running through a portion of the fourth zone 1001d. In such implementations, the fourth zone 1001d wraps around the third wall 1202 resembling a U-shape (similar to the second zone 1001b) and is delimited by the vapor/liquid interfaces that define the boundaries between: the third zone 1001c and the fourth zone 1001d; and the fourth zone 1001d and the first zone 1001a. The difference in liquid head between the vapor/liquid interface between the third zone 1001c and the fourth zone 1001d and the vapor/liquid interface between the fourth zone 1001d and the first zone 1001a fluctuate based on the pressure difference between the first zone 1001a and the third zone 1001c.

In some implementations, the apparatus 1000a includes a second inlet 1104 that is configured to receive a condensable gas 1030 in the third zone 1001c. The condensable gas 1030 entering the third zone 1001c can heat the carbon dioxide sorbent traveling through the third zone 1001c, which facilitates the desorption of carbon dioxide from the carbon dioxide sorbent and in turn, the regeneration of the carbon dioxide sorbent. In some implementations, the condensable gas 1030 includes steam. The steam can be provided by, for example, a steam generation boiler with $CO_2$ capture or a renewable energy source with direct steam generation capacity, such as solar thermal collectors (for example, solar towers, parabolic dishes, parabolic troughs, vacuum panels, or evacuated tube technologies) or indirect steam generation capacity, such as photovoltaic panels or wind turbines coupled with electric resistances or heat pumps. In some implementations, the condensable gas 1030 includes a hydrocarbon.

In some implementations, the apparatus 1000a includes an electric heater 1500 disposed within the third zone 1001c. The electric heater 1500 can also be used to heat the carbon dioxide sorbent traveling through the third zone 1001c. In some implementations, the electric heater is powered by grid electricity, a renewable energy source, such as photovoltaic panels and/or wind turbines coupled to energy storage technologies, such as batteries, or a renewable energy source embedded with energy storage solutions, such as concentrated solar power. In some implementations, the liquid heating medium 1400 is configured to heat the carbon dioxide sorbent from the first temperature to a third temperature within the second zone 1001b, where the third temperature is intermediate of the first temperature and the second temperature. In some implementations, the electric heater 1500 is configured to heat the carbon dioxide sorbent from the third temperature to the second temperature within the third zone 1001c. In some implementations, the condensable gas 1030 and the electric heater 1500 work together to heat the carbon dioxide sorbent to the second temperature within the third zone 1001c.

Figure 1B:
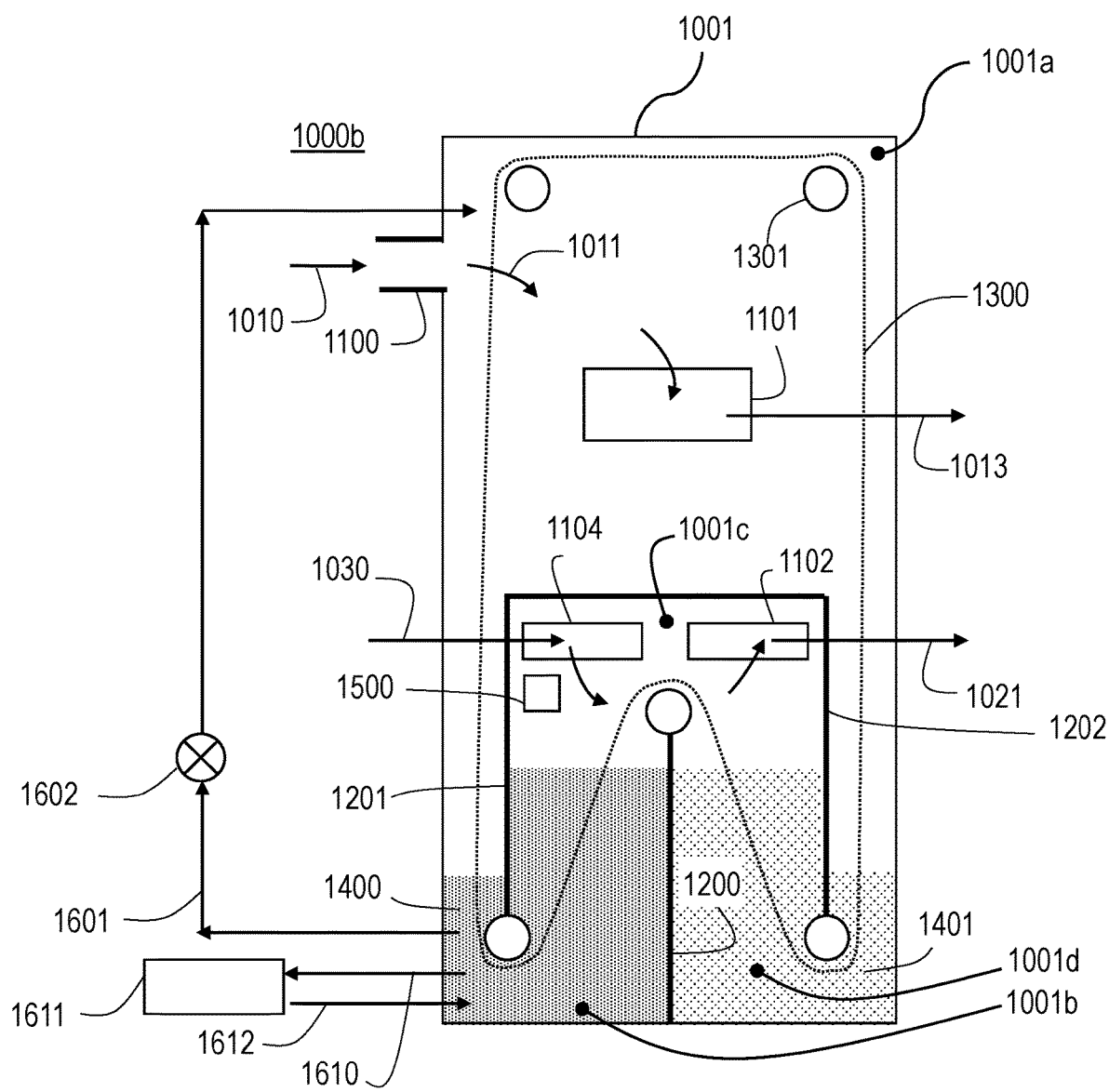
FIG. 1B is a schematic diagram of an example apparatus for carbon dioxide capture.

FIG. 1B is a schematic diagram of an apparatus 1000b for carbon dioxide capture. Apparatus 1000b is substantially similar to apparatus 1000a, but includes additional components. In some implementations, the apparatus 1000b includes a spray line 1601 and pump 1602. In such implementations, the spray line 1601 and pump 1602 can be used to spray at least a portion of the liquid heating medium 1400 to come in contact with the carbon dioxide-containing fluid 1010 flowing to the porous medium 1300 within the first zone 1001a. In some cases, it can be preferable for the spray to discharge in the vicinity of the inlet 1100, such that the spray comes into contact with the carbon dioxide-containing fluid 1010 entering the housing 1001. Although shown in FIG. 1B as starting in the second zone 1001b and ending in the first zone 1001a for spraying the liquid heating medium

1400, the spray line 1601 can alternatively or additionally start in the fourth zone 1001*d* and end in the first zone 1001*a* for spraying the liquid cooling medium 1401. Spraying the liquid heating medium 1400 and/or the liquid cooling medium 1401 to come in contact with the carbon dioxide-containing fluid 1010 can help to draw moisture from the carbon dioxide-containing fluid 1010, thereby reducing the partial pressure of water vapor in the carbon dioxide-containing fluid 1010, especially in cases in which the liquid heating medium 1400 and/or the liquid cooling medium 1400 includes a hygroscopic substance. Capturing water can reduce the available adsorption sites on the carbon dioxide sorbent, and therefore reduce $CO_2$ capture efficiency, which is unfavorable. Reducing the partial pressure of water vapor in the air results in increasing the partial pressure of $CO_2$ and in turn, increasing the capacity of the carbon dioxide sorbent to capture $CO_2$, especially in cases where the carbon dioxide sorbent exhibits an affinity to water.

In some implementations, in addition to or alternatively to including the spray line 1601 and pump 1602, the inlet 1100 is located in the second zone 1001*b* and/or the fourth zone 1001*d*. By nature of being a vapor, the carbon dioxide-containing fluid 1010 bubbles through the liquid heating medium 1400 in the second zone 1001*b* and/or the liquid cooling medium 1401 in the fourth zone 1001*d* to the first zone 1001*a*. In some cases, bubbling the carbon dioxide-containing fluid 1010 through the liquid heating medium 1400 in the second zone 1001*b* and/or the liquid cooling medium 1401 in the fourth zone 1001*d* can have a similar effect of spraying the liquid heating medium 1400 and/or the liquid cooling medium 1401 to come in contact with the carbon dioxide-containing fluid 1010. For example, in cases where the liquid heating medium 1400 and/or the liquid cooling medium 1401 includes a hygroscopic substance, bubbling the carbon dioxide-containing fluid 1010 through the liquid heating medium 1400 in the second zone 1001*b* and/or the liquid cooling medium 1401 in the fourth zone 1001*d* can reduce the water vapor content of the carbon dioxide-containing fluid 1010. An example of the inlet 1100 being located in the second zone 1001*b* is shown in FIG. 2B.

Referring back to FIG. 1B, in some implementations, the apparatus 1000*b* includes a water separation system 1611. The water separation system 1611 can include any water separation technique known in the art, for example, evaporative separation or reverse osmosis. Condensable gas 1030 entering the third zone 1001*c* through second inlet 1104 can condense. In some implementations, a portion of the liquid heating medium 1400 and the condensed water is circulated to the water separation system 1611 via line 1610. The water separation system 1611 removes the condensed water and circulates the liquid heating medium 1400 back to the second zone 1001*b* via line 1612. Although shown in FIG. 1B as circulating the liquid heating medium 1400 from the second zone 1001*b*, the water separation system 1611 can alternatively or additionally be circulated the liquid cooling medium 1401 from the fourth zone 1001*d*.

Figure 1C:
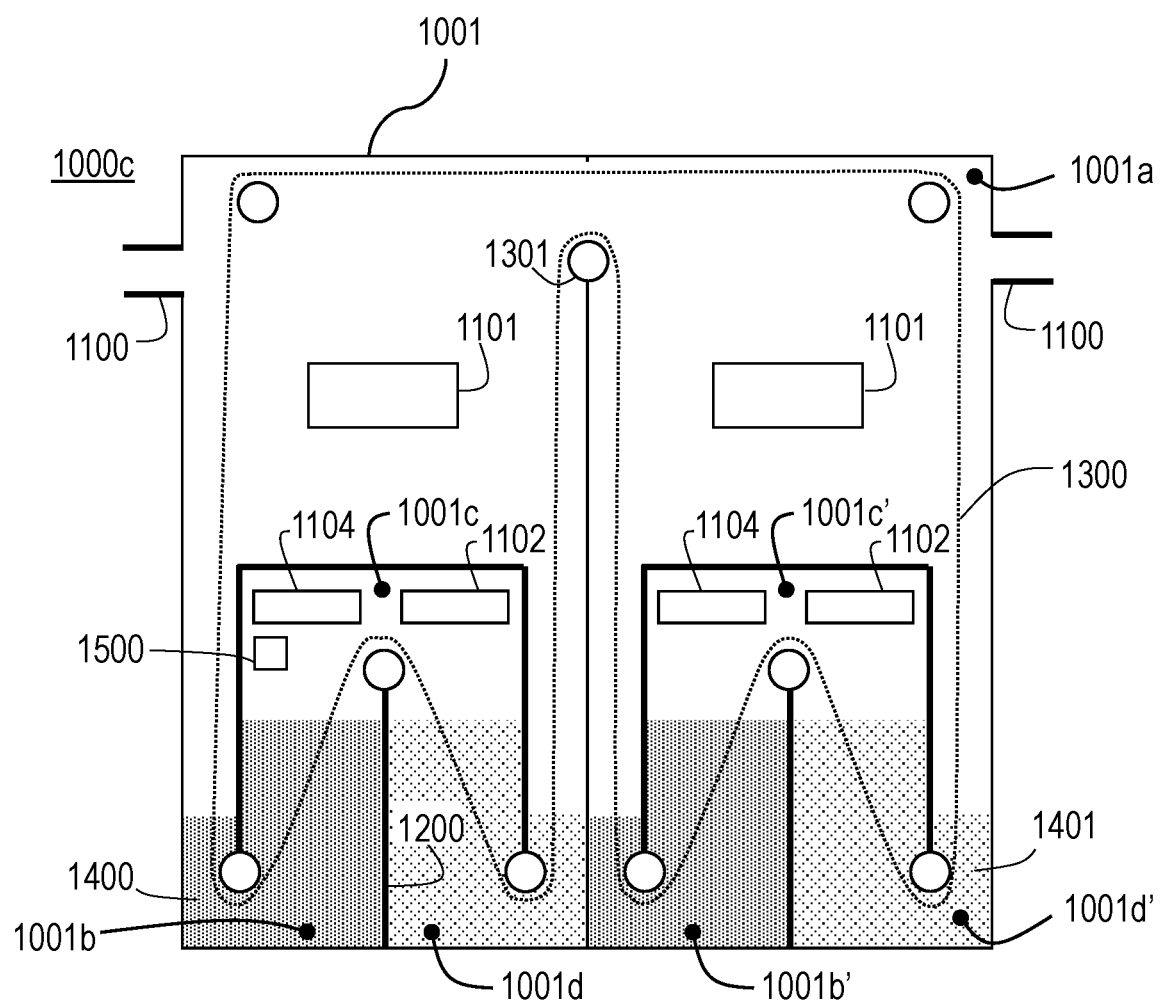
FIG. 1C is a schematic diagram of an example apparatus for carbon dioxide capture.

FIG. 1C is a schematic diagram of an apparatus 1000*c* for carbon dioxide capture. Apparatus 1000*c* is substantially similar to apparatus 1000*a*, but includes some duplicate components. In some implementations, the apparatus 1000*c* includes multiple inlets 1100 for receiving the carbon dioxide-containing fluid 1010. In some implementations, the apparatus 1000*c* includes multiple outlets 1101 for discharging the carbon dioxide-depleted fluid 1013.

In some implementations, the apparatus 1000*c* includes multiple first zones 1001*a*. In some implementations, the apparatus 1000*c* includes multiple second zones 1001*b*. In some implementations, the apparatus 1000*c* includes multiple third zones 1001*c*. In some implementations, the apparatus 1000*c* includes multiple fourth zones 1001*d*. In some implementations, the apparatus 1000*c* includes multiple second outlets 1102 for discharging the carbon dioxide-rich fluid 1021, for example, one second outlet 1102 for each third zone 1001*c*. In some implementations, the apparatus 1000*c* includes multiple second inlets 1104 for receiving condensable gas 1030, for example, one second inlet 1104 for each third zone 1001*c*. Regardless of how many iterations of the second zones 1001*b*, third zones 1001*c*, and fourth zones 1001*d* are included in the apparatus 1000*c*, the conveyor belt 1300 is configured to rotate through an order that always follows first zone 1001*a*, second zone 1001*b*, third zone 1001*c*, and fourth zone 1001*d* and restarting back at the first zone 1001*a*. For example, in the implementation of the apparatus 1000*c* shown in FIG. 1C, the conveyor belt 1300 rotates through the first zone 1001*a*, the second zone 1001*b*, the third zone 1001*c*, and the fourth zone 1001*d*, and then the first zone 1001*a*, the second zone 1001*b'*, the third zone 1001*c'*, and the fourth zone 1001*d'*.

Figure 2A:
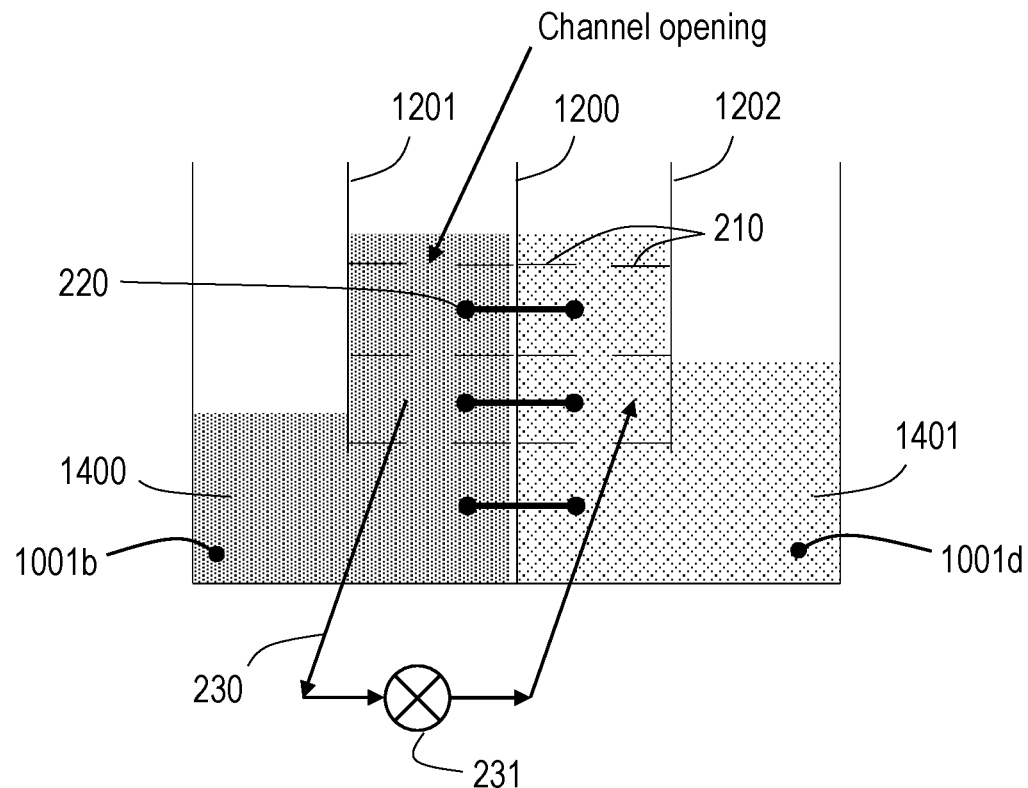
FIG. 2A is a schematic diagram of an example of the heating and cooling zones of any of the apparatuses of FIG. 1A, 1B, or 1C.
Figure 2B:
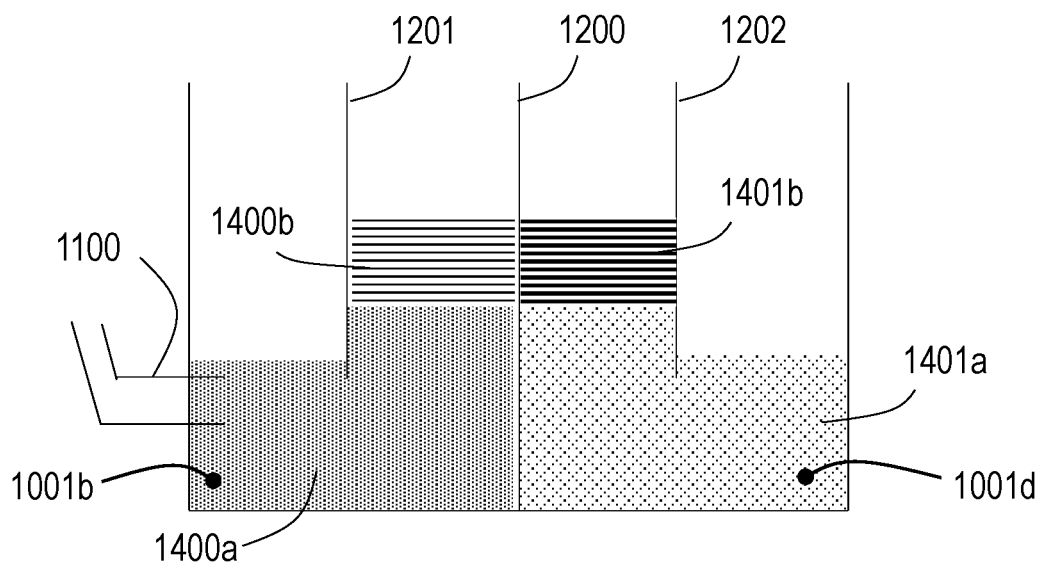
FIG. 2B is a schematic diagram of an example of the heating and cooling zones of any of the apparatuses of FIG. 1A, 1B, or 1C.

FIG. 2A is a schematic diagram of an implementation of the second zone 1001*b* and the fourth zone 1001*d*. In some implementations, the second zone 1001*b* and the fourth zone 1001*d* include baffles 210 that are configured to stratify heat distribution in the liquid heating medium 1400 and the liquid cooling medium 1401, respectively. The heat stratification in the second zone 1001*b* can also improve counter-current heat transfer between the liquid heating medium 1400 and the carbon dioxide sorbent being conveyed by the conveyor belt 1300. Similarly, the heat stratification in the fourth zone 1001*d* can also improve counter-current heat transfer between the liquid cooling medium 1401 and the carbon dioxide sorbent being conveyed by the conveyor belt 1300.

In some implementations, the apparatus 1000*a* (or 1000*b* or 1000*c*) includes a heat exchanger 220 disposed across the wall 1200 that separates the second zone 1001*b* from the fourth zone 1001*d*. In such implementations, the heat exchanger 220 is configured to facilitate heat transfer between the liquid heating medium 1400 in the second zone 1001*b* and the liquid cooling medium 1401 in the fourth zone 1001*d*. In some implementations, the heat exchanger 220 is a heat pipe. In some implementations, the heat exchanger 220 contains a fluid that is circulated between the second zone 1001*b* and the fourth zone 1001*d*.

In some implementations, the apparatus 1000*a* (or 1000*b* or 1000*c*) includes a circulation loop 230 and a circulation pump 231 that are configured to circulate a portion of the liquid heating medium 1400 from the second zone 1001*b* through a region of the fourth zone 1001*d* to facilitate heat transfer between the liquid heating medium 1400 and the liquid cooling medium 1401 in the fourth zone 1001*d*. In some implementations, the circulation loop 230 and the circulation pump 231 are configured to circulate a portion of the liquid cooling medium 1401 from the fourth zone 1001*d* through a region of the second zone 1001*b* to facilitate heat transfer between the liquid cooling medium 1401 and the liquid heating medium 1400 in the second zone 1001*b*.

FIG. 2B is a schematic diagram of an implementation of the second zone 1001*b* and the fourth zone 1001*d*. In some implementations, the second zone 1001*b* is filled with two immiscible fluids: a first liquid heating medium 1400*a* and a second liquid heating medium 1400*b*. In some implementations, the fourth zone 1001*d* is filled with two immiscible fluids: a first liquid cooling medium 1401*a* and a second liquid cooling medium 1401*b*. In the implementation shown in FIG. 2B, the second liquid heating medium 1400*b* has a density that is less than that of the first liquid heating medium 1400a, and the second liquid cooling medium 1401b has a density that is less than that of the first liquid cooling medium 1401a. The density variation and heat stratification can further mitigate mixing of the immiscible fluids. Further, the immiscible fluids can improve heat stratification and heat transfer in the second zone 1001b, in the fourth zone 1001d, or both. As a non-limiting example, the first liquid heating medium 1400a can be water or an aqueous solution operating at a relatively cool temperature with limited to no losses of water vapor to the first zone 1001a, while the second liquid heating medium 1400b can be oil (for example, a mixture of hydrocarbons) with a higher normal boiling point and lower vapor pressure at a relatively hotter temperature that interfaces with the third zone 1001c.

In some implementations, the inlet 1100 is positioned in the second zone 1001b. In such implementations, the carbon dioxide-containing fluid 1010 can bubble through the liquid heating medium 1400a to the first zone 1001a. In some implementations, the inlet 1100 is positioned in the fourth zone 1001b. In such implementations, the carbon dioxide-containing fluid 1010 can bubble through the liquid cooling medium 1401a to the first zone 1001a.

Figure 3A:
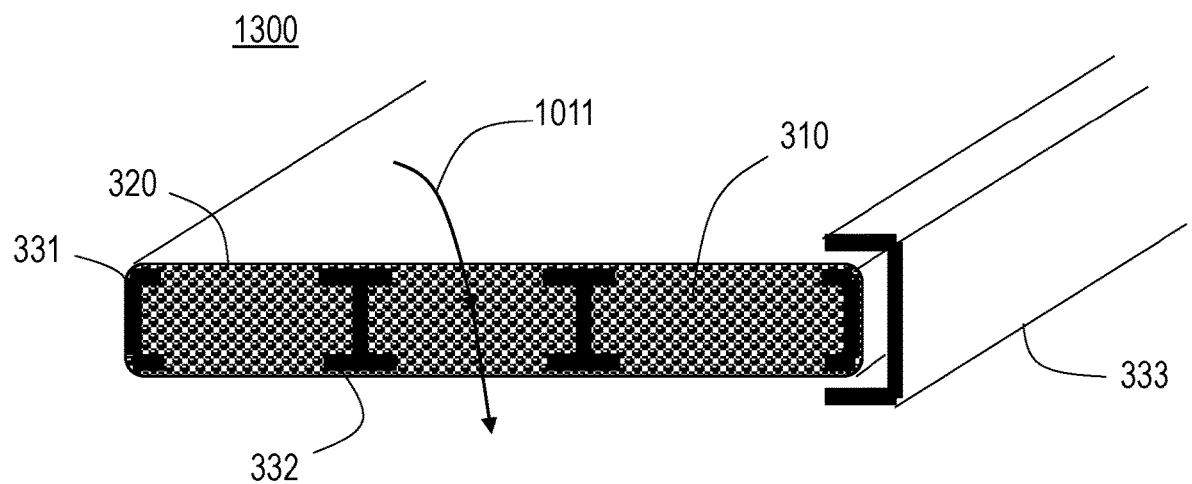
FIG. 3A is a schematic diagram of an example porous medium including a carbon dioxide sorbent that can be implemented in any of the apparatuses of FIG. 1A, 1B, or 1C.

FIG. 3A is a schematic diagram of a portion of an implementation of the conveyor belt 1300. In some implementations, the conveyor belt 1300 includes the porous medium 320. In some implementations, the porous medium 320 includes the carbon dioxide sorbent in the form of solid sorbent particles 310 embedded between porous flexible layers. For example, the porous medium 320 includes multiple porous flexible layers, and the carbon dioxide sorbent 310 is disposed between neighboring porous flexible layers. In some implementations, the porous medium 320 includes inserts 331 and 332 that provide rigidity and structural support for the carbon dioxide sorbent 310. The carbon dioxide-containing fluid 1010 flows through the porous medium 320 (depicted by flow arrow 1011). In some implementations, the conveyor belt 1300 includes a channel 333 surrounding a portion of the porous medium 320. The channel 333 can provide lateral sealing that prevents the carbon dioxide-containing fluid 1010 from bypassing the porous medium 320, so that the carbon dioxide-containing fluid 1010 flows through the porous medium 320 instead of around the porous medium 320.

Figure 3B:
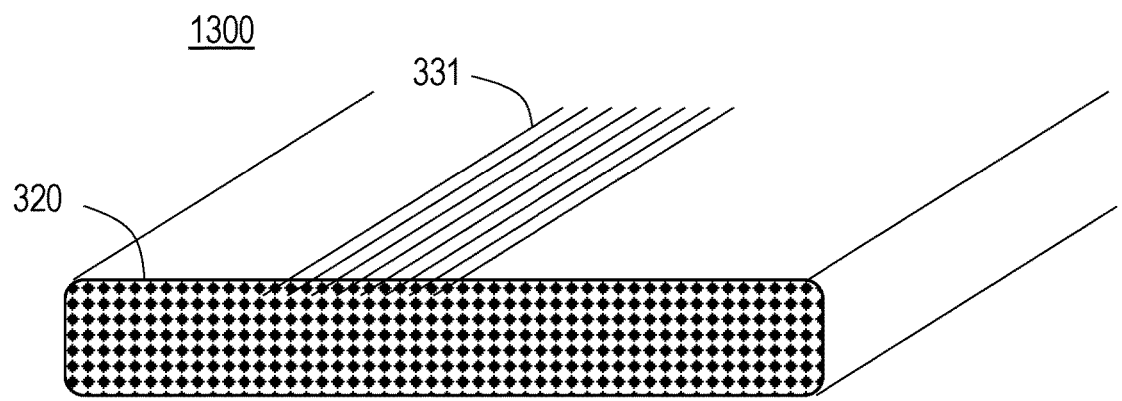
FIG. 3B is a schematic diagram of an example porous medium including a carbon dioxide sorbent that can be implemented in any of the apparatuses of FIG. 1A, 1B, or 1C.

FIG. 3B is a schematic diagram of a portion of an implementation of the conveyor belt 1300. In some implementations, the carbon dioxide sorbent is coated on multiple fibers 331. In some implementations, the fibers 331 are disposed on the conveyor belt 1300 itself. In some implementations, the fibers 331 are disposed on the porous medium 320, and the porous medium 320 is conveyed by the conveyor belt 1300 through the various zones 1001a, 1001b, 1001c, and 1001d.

Figure 3C:
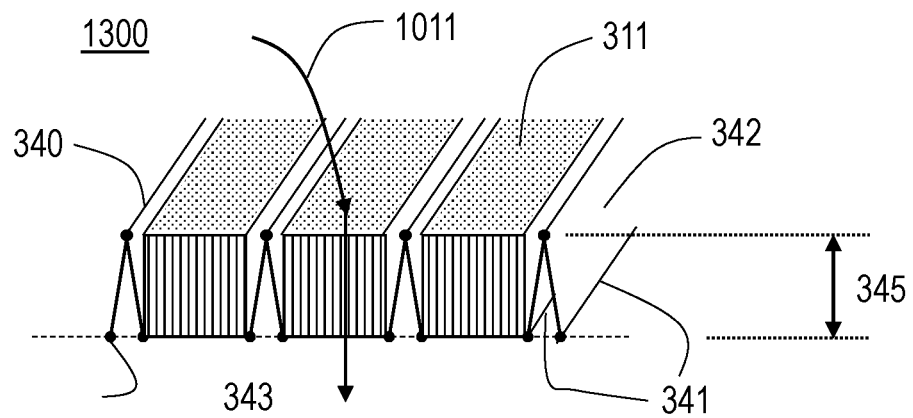
FIGS. 3C, 3D, and 3E are schematic diagrams of a portion of an example porous medium including a carbon dioxide sorbent that can be implemented in any of the apparatuses of FIG. 1A, 1B, or 1C.
Figure 3D:
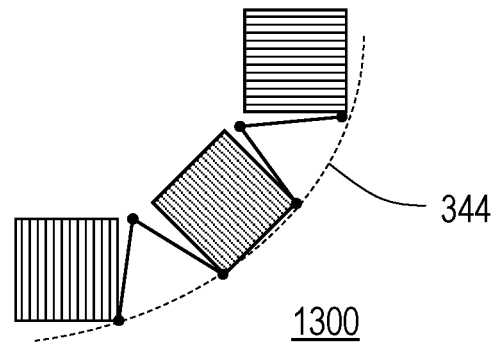
Figure 3E:
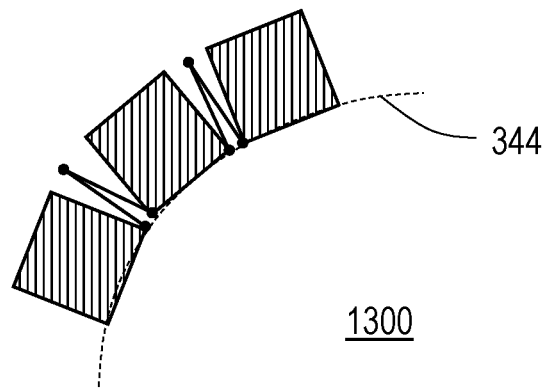

FIGS. 3C, 3D, and 3E are schematic diagrams of a portion of an implementation of the conveyor belt 1300. In some implementations, the conveyor belt 1300 includes multiple blocks 311 having a honeycomb structure, and neighboring blocks 311 are connected to each other to form the conveyor belt 1300. In some implementations, neighboring blocks 311 are connected together by a 3-way hinge formed by an upper hinge 340 and two lower hinges 341. In some implementations, the hinges (340, 341) are linked by a coupling 342. In some implementations, the coupling 342 is in the form of solid panels. In some implementations, the coupling 342 in in the form of flexible panels. The 3-way hinges allow for the conveyor belt 1300 to bend in different directions, as shown in FIGS. 3D and 3E. In some implementations, the 3-way hinges include tips 341 that roll within a channel 344, which guides movement of the tips 341. In some implementations, the lower hinges 341 are linked by a coupling similar to or the same as the coupling 342. In such implementations, the upper hinge 340 can be omitted.

In some implementations, the carbon dioxide sorbent is disposed on a surface of each of the blocks 311, within each of the blocks 311, or both. The carbon dioxide-containing fluid 1010 flows through the blocks 311 (depicted by flow arrow 1011). In some implementations, the blocks 311 have a channel length 345 in a range of from 1 centimeter (cm) to 100 cm. In some implementations, the blocks 311 have a channel length 345 in a range of from 5 cm to 30 cm.

Figure 4:
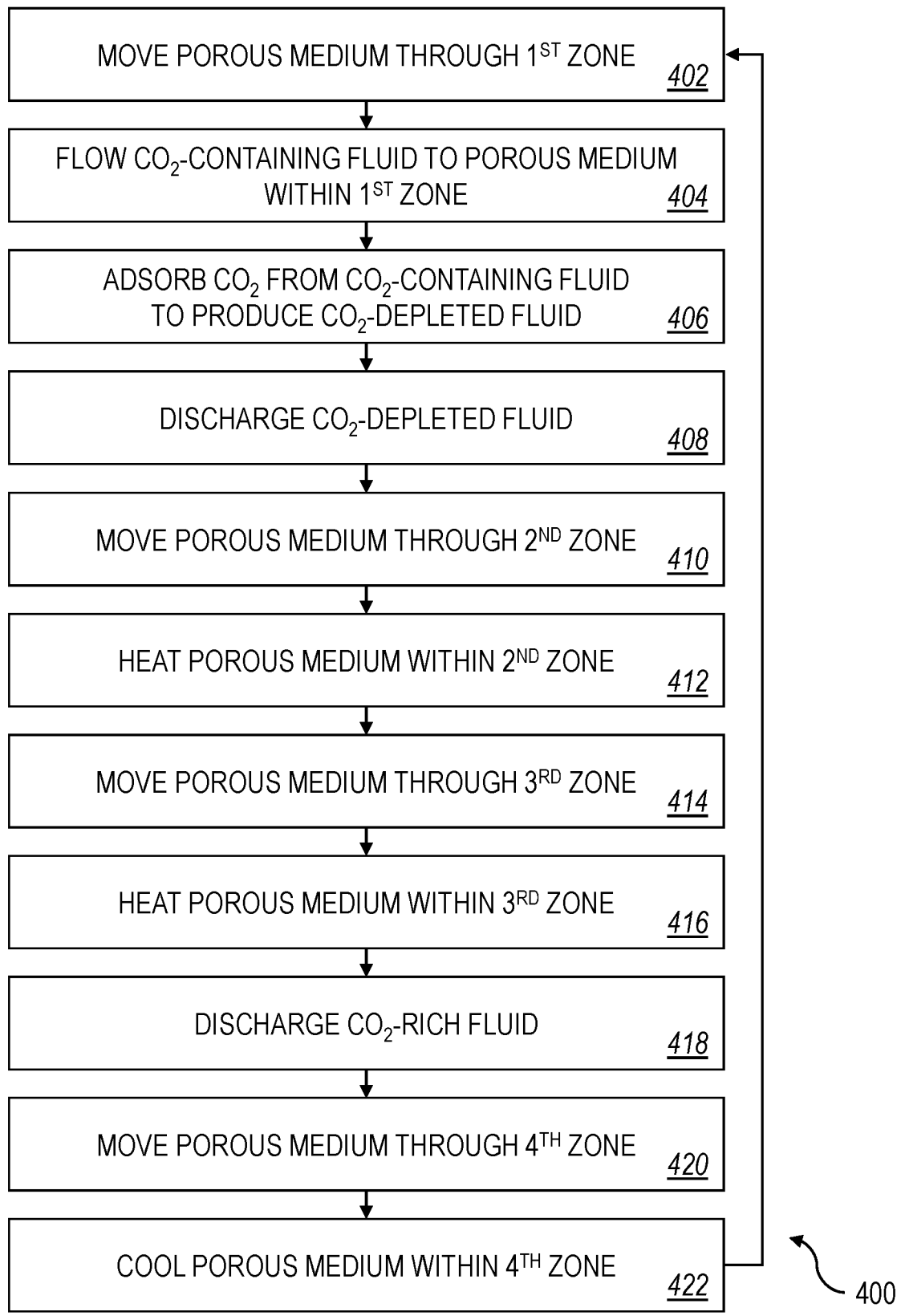
FIG. 4 is a flow chart of an example method for carbon dioxide capture.

FIG. 4 is a flow chart of a method 400 for carbon dioxide capture. Any of the apparatuses 1000a, 1000b, or 1000c can be used to implement method 400. At step 402, a porous medium (such as the porous medium 320) including a carbon dioxide sorbent (such as the carbon dioxide sorbent 310) is moved through a first zone (such as the first zone 1001a) of a housing (such as the housing 1001) by a conveyor belt (such as the conveyor belt 1300) disposed within the housing 1001.

At step 404, a carbon dioxide-containing fluid (such as the carbon dioxide-containing fluid 1010) is flowed to the porous medium 320 within the first zone 1001a, thereby bringing the carbon dioxide-containing fluid 1010 in contact with the carbon dioxide sorbent 310.

At step 406, at least a portion of carbon dioxide from the carbon dioxide-containing fluid 1010 is adsorbed by the carbon dioxide sorbent 310 as the carbon dioxide-containing fluid 1010 flows through the porous medium 320 to produce a carbon dioxide-depleted fluid (such as the carbon dioxide-depleted fluid 1013).

At step 408, the carbon dioxide-depleted fluid 1013 is discharged from the housing 1001 through a first outlet (such as the first outlet 1101) in the first zone 1001a.

At step 410, the porous medium 320 is moved through a second zone (such as the second zone 1001b) of the housing 1000 by the conveyor belt 1300.

At step 412, the porous medium 320 is heated within the second zone 1001b using a liquid heating medium (such as the liquid heating medium 1400). The liquid heating medium 1400 forms a first hydraulic seal between the first zone 1001a and a third zone (such as the third zone 1001c) of the housing 1001.

At step 414, the porous medium 320 is moved through the third zone 1001c of the housing 1001 by the conveyor belt 1300. In some implementations, an operating pressure of the third zone 1001c is equal to or less than an operating pressure of the first zone 1001a.

At step 416, the porous medium 320 is heated within the third zone 1001c. Heating the porous medium 320 within the third zone 1001c at step 416 causes carbon dioxide to desorb from the carbon dioxide sorbent 310 to produce a carbon dioxide-rich fluid (such as the carbon dioxide-rich fluid 1021) and regenerate the carbon dioxide sorbent 310. In some implementations, heating the porous medium 320 within the third zone 1001c at step 416 includes flowing condensable gas 1030 to the third zone 1001c, providing electrical power to the electric heater 1500 disposed within the third zone 1001c, or a combination of these. In some implementations, the porous medium 320 includes an electrically conductive material. In such implementations, heating the porous medium 320 within the third zone 1001c at step 416 can include applying a voltage across the electrically conductive material within the third zone 1001c, which can result in heating the porous medium 320.

At step 418, the carbon dioxide-rich fluid 1021 is discharged from the housing 1001 through a second outlet (such as the second outlet 1102) in the third zone 1001c.

At step 420, the porous medium 320 is moved through a fourth zone (such as the fourth zone 1001d) of the housing 1001 by the conveyor belt 1300.

At step 422, the porous medium 320 is cooled within the fourth zone 1001d using a liquid cooling medium (such as the liquid cooling medium 1401). The liquid cooling medium 1401 forms a second hydraulic seal between the first zone 1001a and the third zone 1001c. In some implementations, the method 400 includes transferring heat across the wall 1200 between the liquid heating medium 1400 in the second zone 1001b and the liquid cooling medium 1401 in the fourth zone 1001d. In some implementations, the method 400 includes circulating a portion of the liquid heating medium 1400 (for example, using the circulation loop 230 and circulation pump 231) from the second zone 1001b through a region of the fourth zone 1001d to facilitate heat transfer between the liquid heating medium 1400 and the liquid cooling medium 1401 in the fourth zone 1001d. In some implementations, the method 400 includes circulating a portion of the liquid cooling medium 1401 (for example, using the circulation loop 230 and circulation pump 231) from the fourth zone 1001d through a region of the second zone 1001b to facilitate heat transfer between the liquid cooling medium 1401 and the liquid heating medium 1400 in the second zone 1001b.

After step 422, the method 400 can then repeat starting back at step 402. In some implementations, at least a portion of the liquid heating medium 1400 is sprayed (for example, using the spray line 1601 and pump 1602) from the second zone 1001b into the first zone 1001a to come in contact with the carbon dioxide-containing fluid 1010 flowing to the porous medium 320 within the first zone 1001a at step 404. In some implementations, at least a portion of the liquid cooling medium 1401 is sprayed (for example, using the spray line 1601 and pump 1602) from the fourth zone 1001d into the first zone 1001a to come in contact with the carbon dioxide-containing fluid 1010 flowing to the porous medium 320 within the first zone 1001a at step 404. In some implementations, the inlet 1101 is located in the second zone 1001b, and the carbon dioxide-containing fluid 1010 flows into the second zone 1001b, bubbles through the liquid heating medium 1400, and then flows into the first zone 1001a before flowing to the porous medium 320 within the first zone 1001a at step 404. In some implementations, the inlet 1101 is located in the fourth zone 1001d, and the carbon dioxide-containing fluid 1010 flows into the fourth zone 1001d, bubbles through the liquid cooling medium 1401, and then flows into the first zone 1001a before flowing to the porous medium 320 within the first zone 1001a at step 404.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. An apparatus comprising:
  a housing defining:
    a first zone for carbon dioxide adsorption;
    a second zone for sorbent heating, the second zone filled with a liquid heating medium;

a third zone for carbon dioxide desorption; and
a fourth zone for sorbent cooling, the fourth zone filled with a liquid cooling medium, wherein the liquid heating medium in the second zone forms a first hydraulic seal between the first zone and the third zone, and the liquid cooling medium in the fourth zone forms a second hydraulic seal between the first zone and the third zone;
an inlet configured to receive a carbon dioxide-containing fluid in the first zone;
a first outlet configured to discharge a carbon dioxide-depleted fluid from the first zone;
a second outlet configured to discharge a carbon dioxide-rich fluid from the third zone; and
a conveyor belt disposed within the housing and passing through each of the first zone, the second zone, the third zone, and the fourth zone, the conveyor belt comprising a porous medium comprising a carbon dioxide sorbent, the conveyor belt configured to rotate within the housing, such that at least a portion of the carbon dioxide sorbent cycles through the first zone, the second zone, the third zone, and the fourth zone repeatedly in sequential order, wherein the carbon dioxide sorbent is configured to:
within the first zone at a first temperature, adsorb carbon dioxide from the carbon dioxide-containing fluid as the carbon dioxide-containing fluid flows through the porous medium to produce the carbon dioxide-depleted fluid; and
within the third zone at a second temperature, desorb the carbon dioxide captured from the carbon dioxide-containing fluid to produce the carbon dioxide-rich fluid, thereby regenerating the carbon dioxide sorbent,
wherein the liquid heating medium in the second zone is configured to heat the carbon dioxide sorbent from the first temperature toward the second temperature, and the liquid cooling medium in the fourth zone is configured to cool the carbon dioxide sorbent from the second temperature to the first temperature.

2. The apparatus of claim 1, wherein the housing comprises a wall that separates the second zone from the fourth zone, and the wall is configured to transfer heat between the liquid heating medium in the second zone and the liquid cooling medium in the fourth zone.

3. The apparatus of claim 2, wherein the inlet is a first inlet, and the apparatus comprises a second inlet configured to receive steam in the third zone.

4. The apparatus of claim 3, comprising an electric heater disposed within the third zone, wherein the liquid heating medium is configured to heat the carbon dioxide sorbent from the first temperature to a third temperature within the second zone, the third temperature intermediate of the first temperature and the second temperature, and the electric heater is configured to heat the carbon dioxide sorbent from the third temperature to the second temperature within the third zone.

5. The apparatus of claim 3, wherein an operating pressure of the third zone is equal to or less than an operating pressure of the first zone.

6. The apparatus of claim 5, wherein:
the second zone comprises a plurality of baffles configured to stratify heat distribution in the liquid heating medium; and
the fourth zone comprises a plurality of baffles configured to stratify heat distribution in the liquid cooling medium.

7. The apparatus of claim 6, comprising a heat exchanger disposed across the wall separating the second zone from the fourth zone, the heat exchanger configured to facilitate heat transfer between the liquid heating medium in the second zone and the liquid cooling medium in the fourth zone.

8. The apparatus of claim 6, comprising a circulation loop configured to circulate a portion of the liquid heating medium from the second zone through a region of the fourth zone to facilitate heat transfer between the liquid heating medium and the liquid cooling medium in the fourth zone.

9. The apparatus of claim 6, wherein the porous medium comprises a plurality of porous flexible layers, and the carbon dioxide sorbent is disposed between neighboring porous flexible layers of the porous medium.

10. The apparatus of claim 6, wherein the carbon dioxide sorbent is coated on a plurality of fibers, and the plurality of fibers is disposed on the porous medium.

11. The apparatus of claim 6, wherein the conveyor belt comprises a plurality of blocks having a honeycomb structure, wherein neighboring blocks are connected to each other to form the conveyor belt, and the carbon dioxide sorbent is disposed on a surface of each of the blocks, disposed within each of the blocks, or a combination thereof.

12. The apparatus of claim 6, wherein at least one of the liquid heating medium or the liquid cooling medium comprises a mixture of water and at least one of calcium chloride, potassium hydroxide, sodium hydroxide, lithium chloride, lithium bromide, ethylene glycol, propylene glycol, tri-ethylene glycol, zinc chloride, potassium formate, or sulfuric acid.

13. A method comprising:
moving, by a conveyor belt disposed within a housing, a porous medium comprising a carbon dioxide sorbent through a first zone of the housing;
flowing a carbon dioxide-containing fluid to the porous medium within the first zone, thereby bringing the carbon dioxide-containing fluid in contact with the carbon dioxide sorbent;
adsorbing, by the carbon dioxide sorbent, at least a portion of carbon dioxide from the carbon dioxide-containing fluid as the carbon dioxide-containing fluid flows through the porous medium to produce a carbon dioxide-depleted fluid;
discharging the carbon dioxide-depleted fluid from the housing through a first outlet in the first zone;
moving, by the conveyor belt, the porous medium through a second zone of the housing;
heating the porous medium within the second zone using a liquid heating medium, the liquid heating medium forming a first hydraulic seal between the first zone and a third zone of the housing;
moving, by the conveyor belt, the porous medium through the third zone of the housing;
heating the porous medium within the third zone, thereby desorbing the carbon dioxide from the carbon dioxide sorbent to produce a carbon dioxide-rich fluid and regenerate the carbon dioxide sorb ent;
discharging the carbon dioxide-rich fluid from the housing through a second outlet in the third zone;
moving, by the conveyor belt, the porous medium through a fourth zone of the housing; and
cooling the porous medium within the fourth zone using a liquid cooling medium, the liquid cooling medium forming a second hydraulic seal between the first zone and the third zone.

14. The method of claim 13, wherein the housing comprises a wall separating the second zone from the fourth zone, and the method comprises transferring heat across the wall between the liquid heating medium in the second zone and the liquid cooling medium in the fourth zone.

15. The method of claim 14, wherein heating the porous medium within the third zone comprises flowing steam to the third zone, providing electrical power to an electric heater disposed within the third zone, or a combination thereof.

16. The method of claim 15, wherein an operating pressure of the third zone is equal to or less than an operating pressure of the first zone.

17. The method of claim 16, comprising circulating a portion of the liquid heating medium from the second zone through a region of the fourth zone to facilitate heat transfer between the liquid heating medium and the liquid cooling medium in the fourth zone.

18. The method of claim 17, wherein the porous medium comprises an electrically conductive material, and heating the porous medium within the third zone comprises applying a voltage across the electrically conductive material within the third zone.

19. The method of claim 17, wherein at least one of the liquid heating medium or the liquid cooling medium comprises a mixture of water and at least one of calcium chloride, potassium hydroxide, sodium hydroxide, lithium chloride, lithium bromide, ethylene glycol, propylene glycol, tri-ethylene glycol, zinc chloride, potassium formate, or sulfuric acid.

20. The method of claim 19, comprising spraying at least a portion of the liquid heating medium or the liquid cooling medium into the first zone to come in contact with the carbon dioxide-containing fluid flowing to the porous medium within the first zone.

* * * * *

UNITED STATES PATENT AND TRADEMARK OFFICE
CERTIFICATE OF CORRECTION

| | | |
|---|---|---|
| PATENT NO. | : 11,571,658 B2 | Page 1 of 1 |
| APPLICATION NO. | : 17/140274 | |
| DATED | : February 7, 2023 | |
| INVENTOR(S) | : Mourad Younes and Aqil Jamal | |

It is certified that error appears in the above-identified patent and that said Letters Patent is hereby corrected as shown below:

In the Claims

Column 16, Line 57, Claim 13, delete "sorb ent;" and insert --sorbent;--.

Signed and Sealed this
Twenty-first Day of March, 2023

*Katherine Kelly Vidal*

Katherine Kelly Vidal
*Director of the United States Patent and Trademark Office*